US011929190B2

(12) United States Patent
Conte (10) Patent No.: US 11,929,190 B2
(45) Date of Patent: Mar. 12, 2024

(54) REMOVAL TROUGH FOR A WIRE PROCESSING SYSTEM, WIRE PROCESSING SYSTEM, AND METHOD FOR REMOVING ONE OR MORE WIRES FROM A REMOVAL TROUGH

(71) Applicant: Komax Holding AG, Dierikon (CH)

(72) Inventor: Alois Conte, Ebikon (CH)

(73) Assignee: KOMAX HOLDING AG, Dierikon (CH)

( * ) Notice: Subject to any disclaimer, the term of this patent is extended or adjusted under 35 U.S.C. 154(b) by 466 days.

(21) Appl. No.: 17/250,344

(22) PCT Filed: Jul. 17, 2019

(86) PCT No.: PCT/EP2019/069268
§ 371 (c)(1),
(2) Date: Jan. 8, 2021

(87) PCT Pub. No.: WO2020/020726
PCT Pub. Date: Jan. 30, 2020

(65) Prior Publication Data
US 2021/0134489 A1 May 6, 2021

(30) Foreign Application Priority Data

Jul. 24, 2018 (EP) ..................................... 18185278

(51) Int. Cl.
*H01B 13/00* (2006.01)
*H01R 43/048* (2006.01)

(52) U.S. Cl.
CPC ....... *H01B 13/0003* (2013.01); *H01R 43/048* (2013.01)

(58) Field of Classification Search
CPC .............. B65G 57/186; B65H 2405/11; B65H 2405/1113; B65H 2405/11131; B65H 31/3036; B65H 31/3045; H01B 13/0003; B21C 49/00; H01R 43/048; H01R 43/052; H01R 43/055
USPC .............................. 414/226.02, 222.04–222.6
See application file for complete search history.

(56) References Cited

U.S. PATENT DOCUMENTS

| | | | | |
|---|---|---|---|---|
| 2,998,633 A | * | 9/1961 | Andren | H02G 1/1248 29/33 M |
| 3,217,461 A | * | 11/1965 | Wheelock | B65B 13/022 100/9 |
| 3,245,135 A | * | 4/1966 | Netta | B65G 47/1471 29/748 |
| 3,298,217 A | * | 1/1967 | Andren | H01R 43/052 72/434 |

(Continued)

FOREIGN PATENT DOCUMENTS

| | | |
|---|---|---|
| CN | 102447210 A | 5/2012 |
| EP | 0788200 A2 | 8/1997 |

(Continued)

*Primary Examiner* — Jason L Vaughan
(74) *Attorney, Agent, or Firm* — William J. Clemens; Shumaker, Loop & Kendrick, LLP (57) ABSTRACT

A removal trough for a wire processing system receives wires processed by a wire processing machine of the wire processing system, wherein side walls of the removal trough each have one or more recesses and/or indentations formed therein for mechanical gripping of the wires in the removal trough by a gripping arm.

10 Claims, 5 Drawing Sheets

(56) References Cited

U.S. PATENT DOCUMENTS

| | | | | |
|---|---|---|---|---|
| 3,870,774 | A | * | 3/1975 | Maroschak ............ B65G 47/82 |
| | | | | 425/DIG. 231 |
| 3,941,639 | A | * | 3/1976 | Maroschak .......... B65G 57/186 |
| | | | | 156/244.14 |
| 5,960,622 | A | | 10/1999 | Koch et al. |
| 6,463,849 | B2 | * | 10/2002 | Mizutani ................ H01R 43/28 |
| | | | | 29/33 M |
| 9,373,924 | B2 | | 6/2016 | Fischer |
| 9,640,954 | B2 | | 5/2017 | Fischer |
| 2001/0032680 | A1 | | 10/2001 | Mizutani |
| 2012/0263344 | A1 | | 10/2012 | Viviroli |

FOREIGN PATENT DOCUMENTS

| | | |
|---|---|---|
| EP | 2738886 A1 | 6/2014 |
| EP | 2511648 B1 | 12/2016 |
| EP | 2442413 B1 | 8/2017 |
| EP | 3219654 A1 | 9/2017 |
| JP | H09286565 A | 11/1997 |
| JP | 2001287711 A | 10/2001 |

\* cited by examiner

REMOVAL TROUGH FOR A WIRE PROCESSING SYSTEM, WIRE PROCESSING SYSTEM, AND METHOD FOR REMOVING ONE OR MORE WIRES FROM A REMOVAL TROUGH

FIELD

The present invention relates to a removal trough for a wire processing system, to a wire processing system, and to a method for removing one or more wires from a removal trough.

BACKGROUND

In a wire processing machine, such as a crimping machine, processed wires, such as crimped wires, first reach a wire tray, and are then dumped from the wire tray into a removal trough. Several wires are collected in the removal trough until a so-called production lot, i.e. a predetermined number, of wires has been collected in the removal trough.

Thereafter, the operation of the wire processing machine must be stopped until the wires have been removed/taken from the removal trough manually or by hand in order to avoid mixing up different batches of wires.

This leads to frequent interruptions in the operation of the wire processing machine. Automated and/or mechanical removal of wires from removal troughs known to date for wire processing machines is technically very complex or almost impossible.

Among other things, there may be a need for a removal trough for a wire processing system, and/or a wire processing system, and/or a method, wherein or by means of which the wire can be removed from the removal trough in a technically simple and rapid manner, automatically and/or mechanically.

SUMMARY

According to one aspect of the invention, a removal trough for a wire processing system is proposed, wherein the removal trough is designed to receive wires processed by a wire processing machine of the wire processing system, wherein each of the side walls of the removal trough has one or more recesses and/or indentations for mechanically gripping the wires in the removal trough, in particular by means of a gripping arm.

This results in the advantage that the wires or the wire lot can typically be removed from the removal trough in a technically simple and rapid manner, in an automated or mechanized manner, due to the shape of the removal trough. A part of a gripper or a gripping arm can typically be inserted into the recesses and/or indentations of the side wall and/or side walls of the removal trough, such that the gripper or gripping arm can grasp and hold the wires or batches of wires in a technically simple manner, and can then move the wires out of the removal trough. With the option of automatically and/or mechanically removing the wires from the removal trough, the operation of the wire processing machine typically does not have to be interrupted when a batch of wires has been completed.

According to a second aspect of the invention, a wire processing system is proposed which comprises a wire processing machine for processing a wire, and a removal trough as described above, wherein the removal trough is designed to receive wires processed by the wire processing machine, and wherein the removal trough is arranged below a wire tray of the wire processing system in such a manner that the wires can move from the wire tray into the removal trough by the rotation and/or tilting of the wire tray.

The advantage of this is that the wires or batches of wires processed by the wire processing machine can typically be removed from the removal trough in a technically simple and fast manner, in an automated or mechanized manner, due to the shape of the removal trough. A part of a gripper or a gripping arm can typically be inserted into the recesses and/or indentations of the side wall and/or side walls of the removal trough, such that the gripper or gripping arm can grasp and hold the wires or batches of wires processed by the wire processing machine and then move the wires out of the removal trough. With the option of automatically and/or mechanically removing the wires from the removal trough, the operation of the wire processing machine typically does not have to be interrupted when a batch of wires has been completed.

According to a third aspect of the invention, a method for removing one or more wires from a removal trough, in particular a removal trough as described above, of a wire processing system is proposed, wherein the removal trough is designed and arranged to receive wires processed by a wire processing machine of the wire processing system, wherein the method comprises the following steps: moving a part of the gripping arm into depressions and/or indentations of the removal trough; gripping wires located in the removal trough by means of the gripping arm; and moving the gripping arm with the gripped wires out of the removal trough.

One advantage of this is that, due to the automated or mechanical gripping and removal of the wires from the removal trough, the operation of the wire processing machine typically does not have to be interrupted when a batch of wires has been produced. With the method, the wires can generally be removed automatically and/or mechanically from the removal trough in a technically simple and rapid manner.

Possible features and advantages of embodiments of the invention may be considered, inter alia and without limiting the invention, to be based on the ideas and findings described below.

According to one embodiment of the removal trough, the removal trough has a rib-like structure. One advantage of this is that part of a gripping arm or a mechanical gripper can typically easily grip the wires at several points on the removal trough.

According to one embodiment of the removal trough, the removal trough has a plurality of recesses and/or indentations in the side walls, which are arranged in each of the side walls at equal distances from each other. The advantage of this is that typically two or more parts of the gripping arm can grip the wires in the removal trough on both sides of the side walls of the removal trough and/or both sides of the wires. As a rule, it is also possible for a plurality of gripping arms to be able to grip wires, particularly longer wires, at the same time, and for the wires to be removed from the removal trough in a technically simple and rapid manner.

According to one embodiment of the removal trough, a bottom surface of the removal trough which is designed for partially resting the wires in the removal trough particularly has recesses and/or indentations arranged at equidistant intervals for the mechanical gripping of a side of the wires facing a bottom of the removal trough. The advantage in this case is that part of the gripping arm can typically get under parts or regions of the wires in a technically simple manner, and thus can grip and hold the wires even better.

According to one embodiment of the removal trough, the removal trough has been produced by deep drawing. In this way, the depressions and/or recesses of the removal trough can be designed in a technically simple and cost-effective manner and in a material-saving manner.

According to one embodiment of the removal trough, the removal trough is symmetrical with respect to a longitudinal plane of the removal trough, wherein the longitudinal plane runs along a longitudinal axis of the wires when the wires are in the removal trough. As a result, the removal trough can typically be installed in a technically simple manner, since there is no need to pay attention to the alignment of the removal trough. In addition, parts of the gripping arm can generally be inserted into the two opposite side walls of the removal trough in the same way. Here as well, the alignment of the gripping arm and/or the direction of movement of the gripping arm typically does not have to be taken into account, since the two side walls are symmetric in design. In general, this makes it even easier to remove the wires from the removal trough.

According to one embodiment of the removal trough, the removal trough is composed of several removal trough parts, in particular several removal trough parts that are structurally identical to each other. The advantage of this is that parts of the removal trough can typically be exchanged in a technically simple manner, and repairs can thus be carried out quickly and inexpensively. In the case of removal trough parts that are structurally identical to each other, replacement or repair is typically even easier, since the same removal trough component can be used at every point of the removal trough.

According to one embodiment of the removal trough, the recesses and/or indentations in the side walls are designed in such a way that the side walls are each open to the side at the locations of the recesses and/or indentations. The advantage of this is that a gripping arm can typically be inserted in a technically simple manner from the sides of the removal trough, and/or a gripping arm can grasp or grip the wires located in the removal trough in a technically simple manner from two opposite sides.

According to one embodiment of the removal trough, the recesses and/or indentations in the side walls along the longitudinal direction of the wires, when these are located in the removal trough, have a lesser width than the remaining ribs in the given side wall between the recesses and/or indentations. The advantage of this is that the wires are typically held particularly securely in the removal trough.

According to one embodiment of the wire processing system, the removal trough is designed to be displaceable relative to the wire tray along a longitudinal direction of the wires when these are located in the removal trough. As a result, the removal trough can typically be moved in a technically simple manner into a position in which a gripping arm can grasp the wires in the removal trough in a particularly technically simple manner. In particular, the removal trough can usually be moved to a position in which no part of the wire processing machine obstructs the gripping arm when the wires are removed from the removal trough. This means that the wires can generally be removed mechanically from the removal trough even faster, since the movements of the gripping arm can be carried out more quickly.

According to one embodiment of the wire processing system, the wire processing system further comprises a gripping arm for gripping and holding the wires, wherein the recesses and/or the indentations in the side walls and/or the recesses and/or the indentations in the bottom surface are designed to receive a part of the gripping arm. The advantage of this is that the recesses and/or indentations typically are or can be adapted particularly precisely to the gripping arm, such that the removal of the wires can generally be carried out technically even more simply, and even more rapidly.

According to one embodiment of the wire processing system, the gripping arm has two jaws, each with two gripping hooks. The advantage of this is that the wires can typically be held particularly securely by the gripping arm.

According to one embodiment of the method, when the wires situated in the removal trough are gripped, the gripping arm, except for two jaws of the gripping arm which are moved towards each other for gripping the wires by the gripping arm, is not moved. As a result, the wires or the batch of wires can typically be gripped and/or grasped particularly securely by the gripping arm.

It should be noted that some of the possible features and advantages of the invention are described herein with reference to different embodiments of the removal trough and/or the cable processing system and/or the method. A person skilled in the art will recognize that the features can be suitably combined, adapted or replaced in order to arrive at further embodiments of the invention.

Embodiments of the invention will be described in the following with reference to the accompanying drawings, although neither the drawings nor the description should be construed as limiting the invention.

The figures are merely schematic and are not true to scale. Like reference signs refer to like or equivalent features in the various figures.

DETAILED DESCRIPTION

Figure 1:
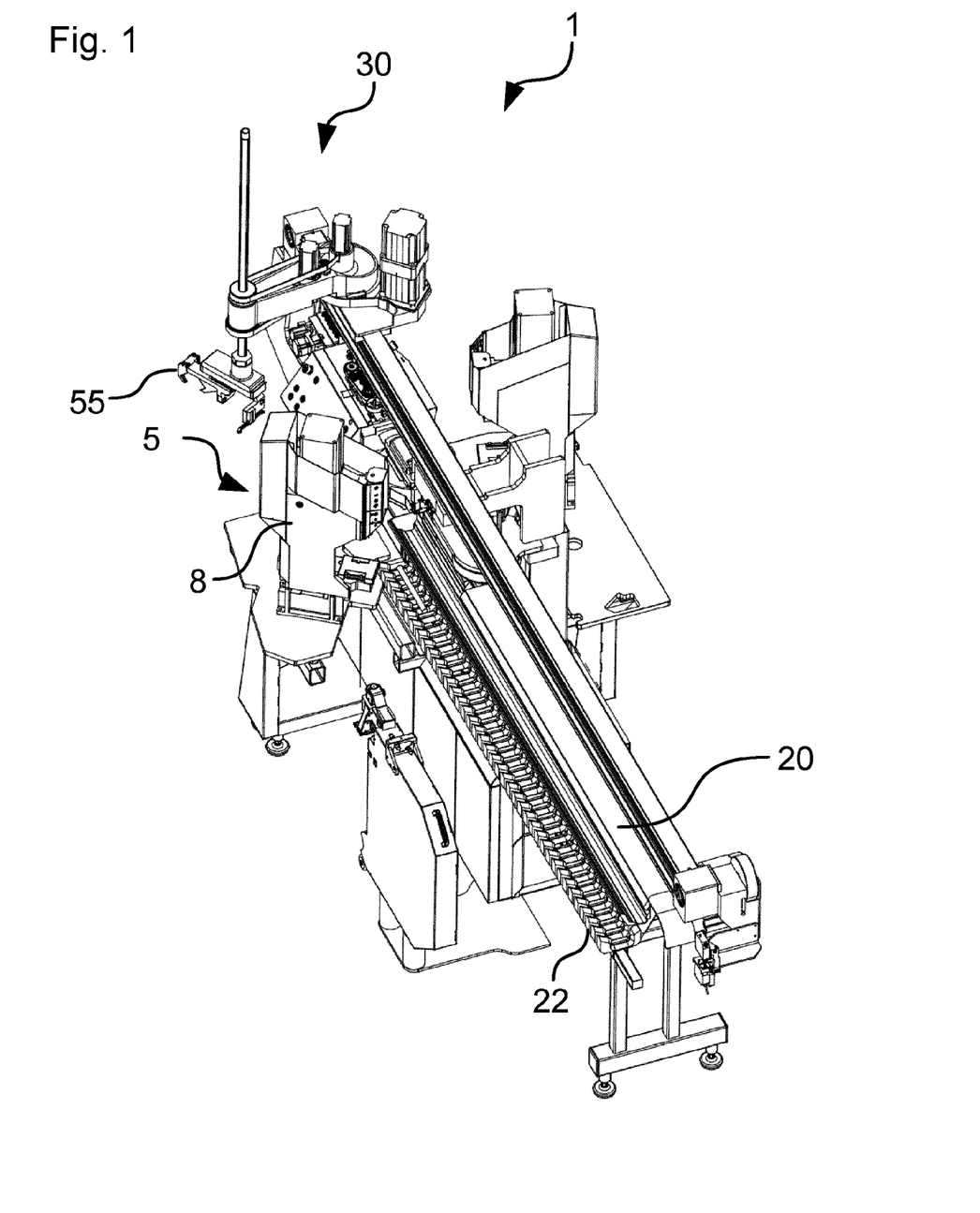
FIG. 1 shows a perspective view of an embodiment of the wire processing system according to the invention, with an embodiment of the removal trough according to the invention.
Figure 2:
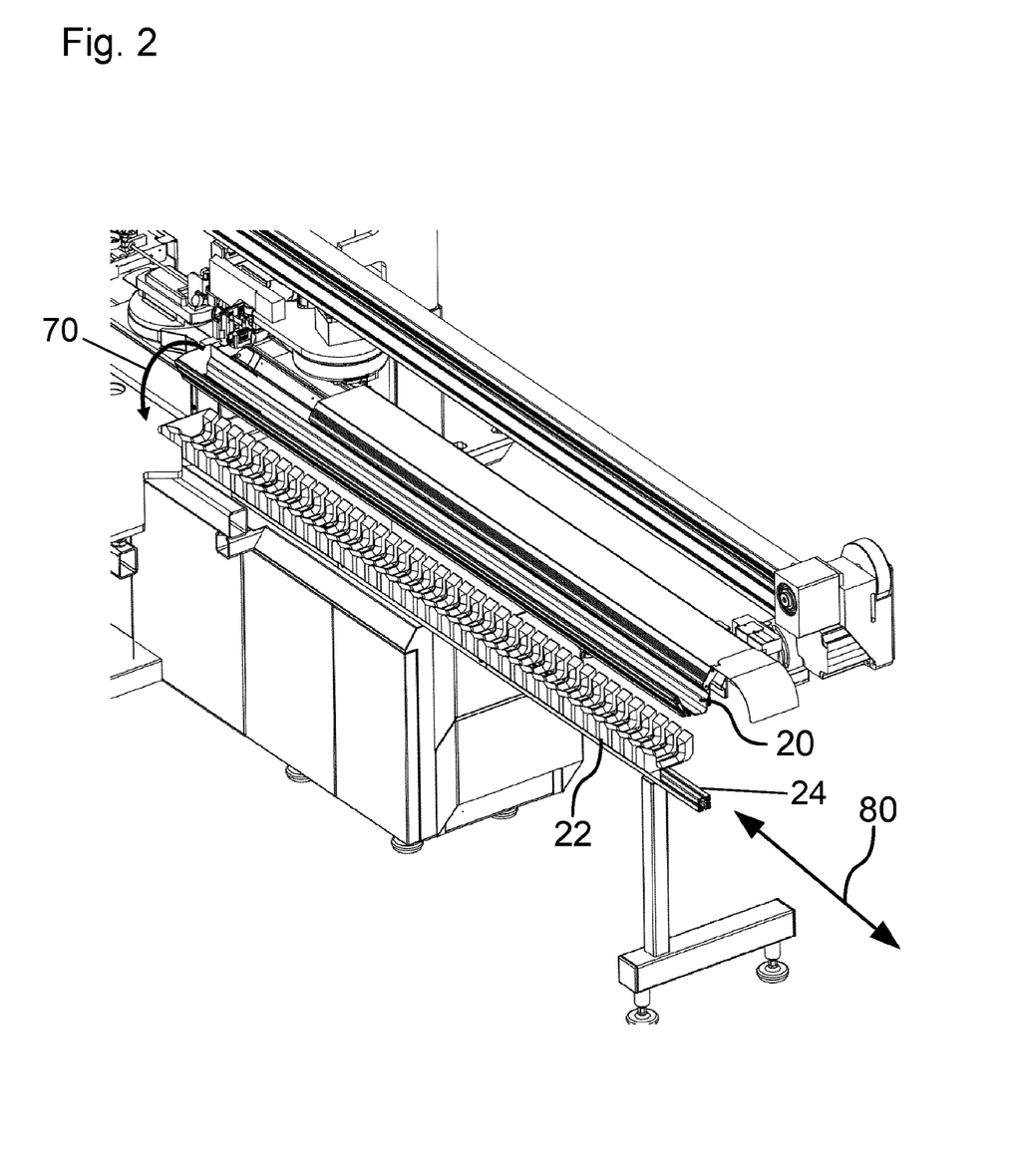
FIG. 2 shows a perspective detailed view of the removal trough of FIG. 1.
Figure 3:
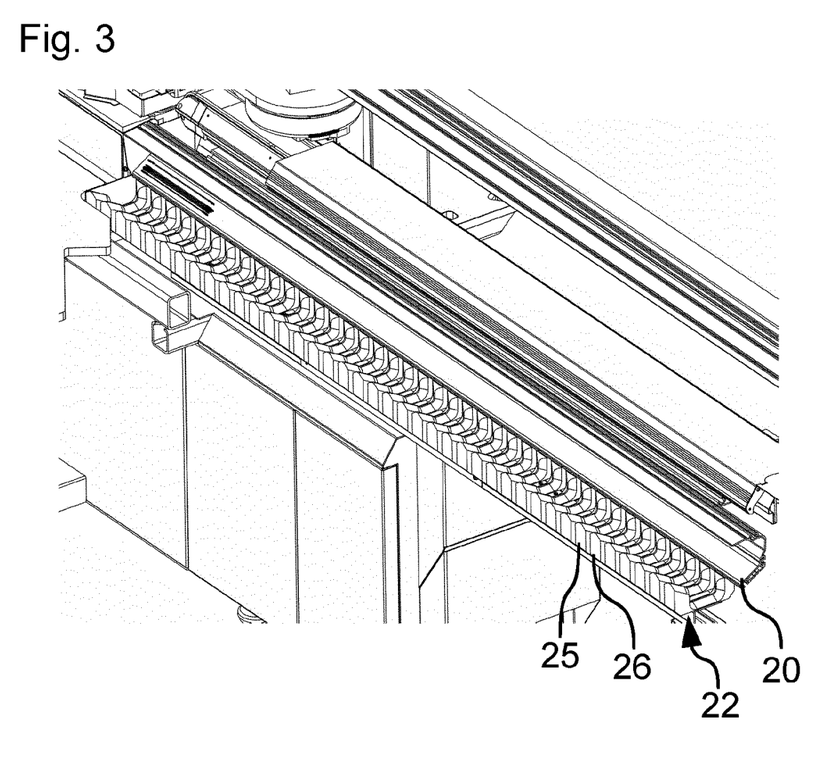
FIG. 3 shows a further perspective detailed view of the removal trough of FIG. 1.

FIG. 1 shows a perspective view of an embodiment of the wire processing system 1 according to the invention, with an embodiment of the removal trough 22 according to the invention. FIG. 2 shows a perspective detailed view of the removal trough 22 from FIG. 1. FIG. 3 shows a further perspective detailed view of the removal trough 22 from FIG. 1.

The wire processing system 1 comprises a wire processing machine 5, a handling robot 30 with a gripping arm 55 or mechanical gripper, and the removal trough 22. The wire processing machine 5 can be a crimping machine or a crimping press 8 for connecting a wire 15 (FIG. 4) to a crimp contact.

The wire(s) 15 processed by the wire processing machine 5 arrive(s) in a wire tray 20. The wire 15 or wires 15 is/are dumped (arrow 70 in FIG. 2) or moved from the wire tray 20 into the removal trough 22, which is arranged obliquely below the wire tray 20, by pivoting or tilting the wire tray 20 along the arrow 80 shown in FIG. 2.

Usually, several processed wires 15 are collected in the removal trough 22 until a batch, that is to say a predetermined number of items, in particular of similarly processed wires 15, has been reached in the removal trough 22. Then, the wires 15 or the batch of wires 15 is/are removed. It is also possible for several batches of wires 15 to be collected at different locations on the removal trough 22 before the wires 15 are removed from the removal trough 22.

Figures 5A, 5B:
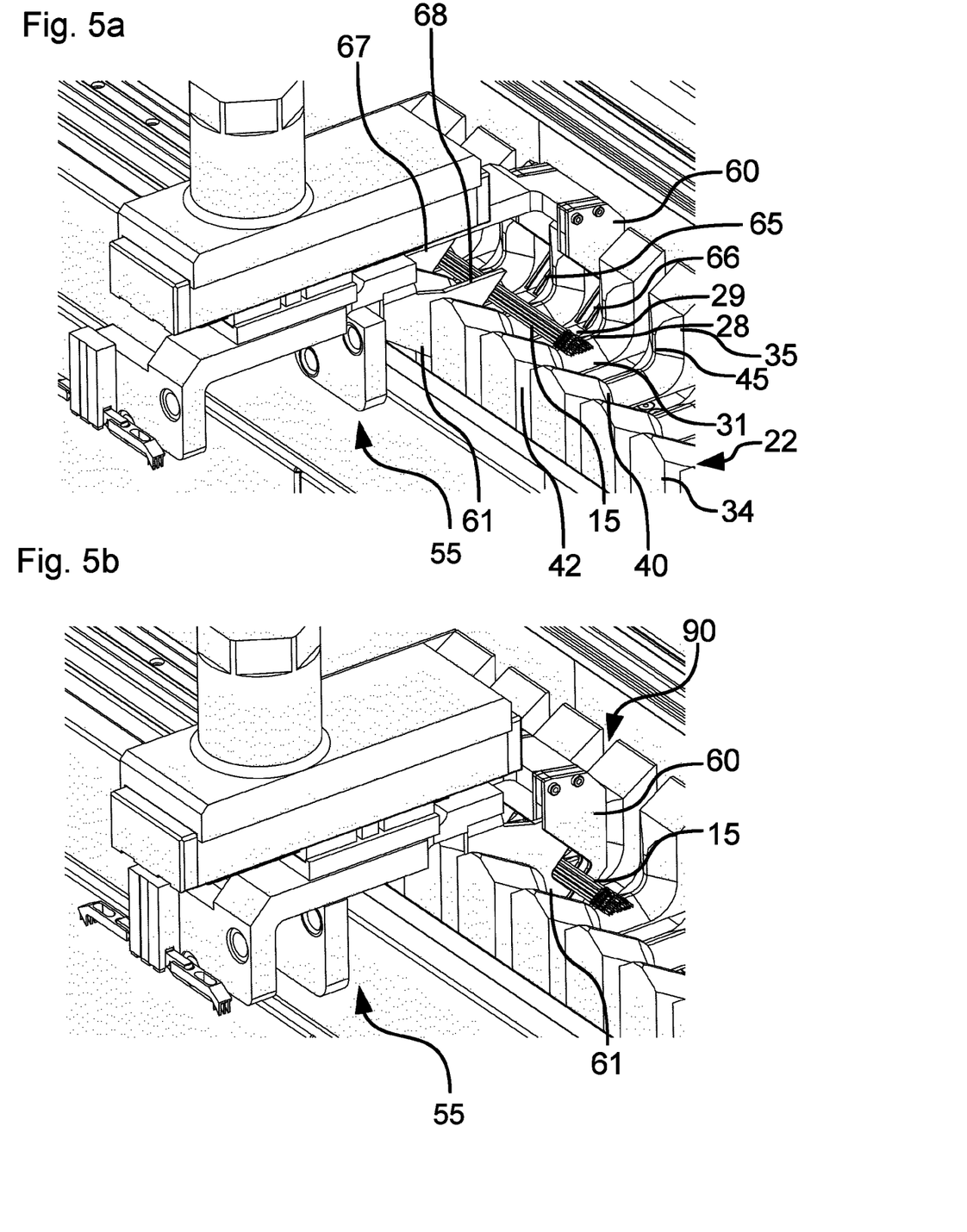
FIG. 5a shows a perspective view of the removal trough of FIG. 4, wherein the jaws of the gripping arm are in an open position.
FIG. 5b shows a perspective view of the removal trough of FIG. 4, wherein the jaws of the gripping arm are in a closed position and are gripping the batch of wires.

The removal trough 22 has two opposite side walls 34, 35 and is U-shaped as shown in FIG. 5a. A bottom surface 28 is formed between the side walls 34, 35—that is, in the middle of the U-shape—for resting or holding the wires 15 or batch of wires 15.

Figure 4:
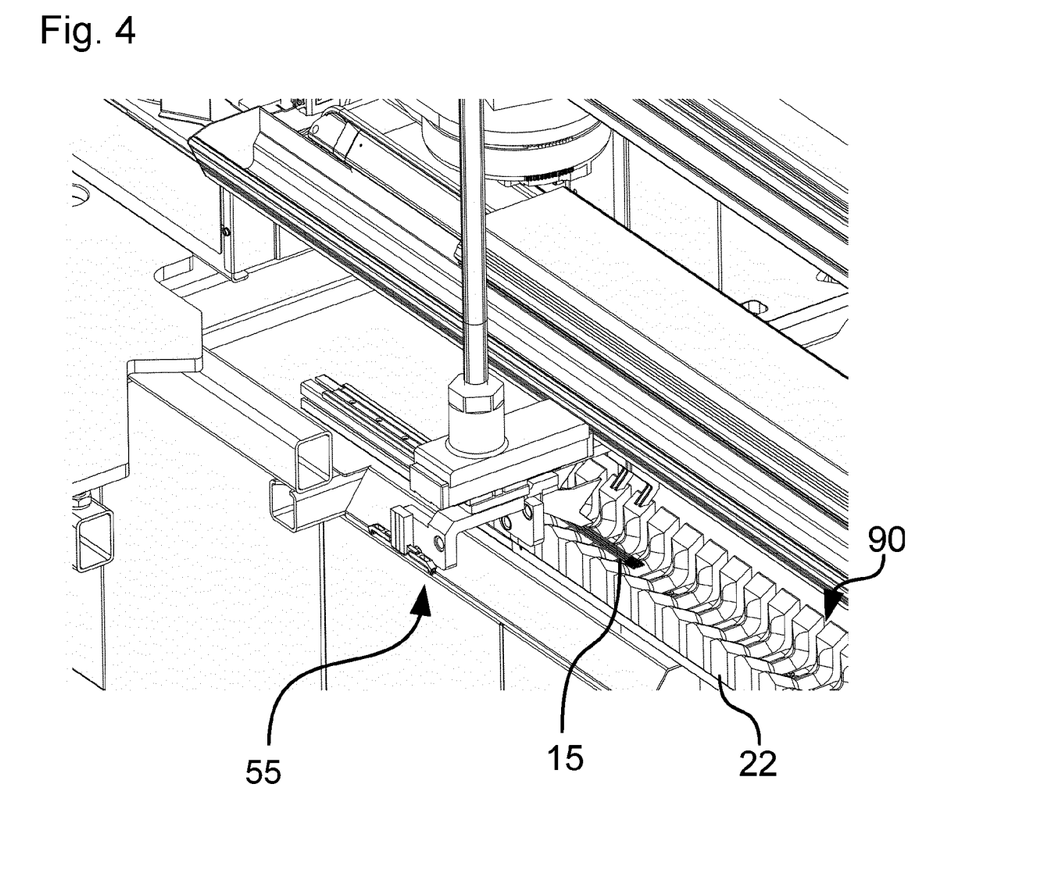
FIG. 4 shows a perspective view of the removal trough of FIG. 1, with a batch of wires in the removal trough, and a gripping arm.

The side walls 34, 35 each have a plurality of recesses 90 and/or depressions or indentations (FIG. 4). This means that the side walls 34, 35 have gaps in several places and are not continuous. The side walls 34, 35 thus have a rib-like structure. The recesses 90 and/or depressions or indentations are formed equidistant from each other. The recesses 90 or depressions run perpendicular to the wires 15 when these are held in the removal trough 22.

The recesses 90 or depressions of the side walls 34, 35 have a lesser width parallel to the longitudinal direction (the direction of their greatest extent) of the wires 15 in the removal trough 22 than the remaining ribs 25, 26 (FIG. 3) of the side walls 34, 35.

A part of a gripping arm 55 or a mechanical gripper can be inserted into the recesses 90 and/or depressions in the side walls 34, 35. The gripping arm 55 or the mechanical gripper is designed to grasp the wires 15 or the batch of wires 15 which are located in the removal trough 22.

The removal trough 22 is designed symmetrically with respect to a plane of symmetry that runs perpendicular to the bottom and through the wires 15 or the batch of wires 15 when the wires 15 or the batch of wires 15 is/are situated in the removal trough 22 on the bottom surface 28. Ribs 25, 26 of the side walls 34, 35 are thus located opposite each other, and recesses or depressions in the side walls 34, 35 are located opposite each other.

The bottom surface 28, which carries or supports the wires 15, also has recesses 90 and/or depressions. This means that the bottom surface 28 is repeatedly interrupted by the recesses 90 or depressions or indentations. Wires 15 in the removal trough 22 therefore do not lie over their entire surface or with their entire underside on the bottom surface 28 of the removal trough 22, but only touch or contact with their underside the bottom surface 28 of the removal trough 22.

The bottom surface 28 is also designed with ribs.

The recesses 90 and/or depressions of the bottom surface 28 can be present at the same point along the longitudinal direction of the wires 15 at which the recesses 90 and/or depressions are formed. This means that ribs 25, 26 of side walls 34, 35 simultaneously form or are ribs 25, 26 of the bottom surface 28.

As can be clearly seen in FIG. 5a, each rib 25, 26 has sloping surfaces 31 on two opposite sides in the direction of the axis of the wires 15, when they are in the removal trough 22, which lead downward from the height of the bottom surface 28. A base surface 29 is formed between the respective ribs 25, 26 of the bottom surface 28, and is at a lower height than the compensation surface.

A movement from the center of a rib 25 of the removal trough 22/the recess surface to the center of the immediately-following rib 26 of the removal trough 22 begins on the horizontally running bottom surface 28 of the first rib 25. What follows is the sloping surface 31, which runs from the bottom surface 28 downwards. The sloping surface 31 then leads to the horizontally running base surface 29, which is wider than the bottom surface 28 of the rib 25, 26 in a direction parallel to the axis of the wires 15 when they are in the removal trough 22. The base surface 29 runs parallel to the bottom surface 28, but it is located at a lower height. After the horizontally running base surface 29 comes a sloping surface 31 of the second rib 26 immediately adjacent to the first rib 25. Following this sloping surface 31 of the second rib 26, the height position increases up to the height of the bottom surface 28, at the bottom surface 28 of the second rib 26.

The side walls 34, 35 of the removal trough 22 have, on the inside of the removal trough 22, sloping surfaces 40 of similar design to those of the bottom surface 28. The sloping surfaces 40 of the side walls 34, 35 lead from side wall surfaces of the given rib 25, 26, said surfaces running parallel to the wire axis (the longitudinal direction of the wires 15 when they are in the removal trough 22), to edge surfaces 42 of the rib 25, 26, which run perpendicular to the wire axis.

One of the side walls 34, 35 can be configured differently on its upper side than the upper side of the other side wall 34, 35. As shown in FIG. 5a, the upper side of the left side wall 34 has a different design than the upper side of the right side wall 35.

The left side wall 34 has several surfaces on its upper side, wherein a trapezoidal surface of the surfaces runs horizontally, and the three surfaces adjacent thereto each run obliquely downward in the direction of the inside of the removal trough 22.

The upper side of the right side wall 35 has a rectangular surface which runs over the entire width of the rib 25, 26 and which runs horizontally. In addition, a single sloped, rectangular surface is formed immediately adjoining this in the direction of the inside of the removal trough 22, which runs obliquely downward. Immediately adjoining this rectangular surface in the direction of the center of the rib 25, 26 is a side wall surface 45 of the side wall 34, 35, running parallel to the longitudinal axis of the wires 15.

The bottom surface 28 of the respective rib 25, 26 merges continuously into the side wall surfaces of the given side walls 34, 35 of the rib 25, 26.

Each of the base surfaces 29 can extend laterally into the recesses 90 or depressions in the side walls 34, 35.

Both the recesses 90 or depressions in the side walls 34, 35 and the recesses 90 or depressions in the bottom surface 28 are designed to receive a part of a gripping arm 55. This means that a part of a gripping arm 55 can be inserted into the recesses 90 or depressions.

The gripping arm 55 can be part of a handling robot 30 which handles and/or grips, holds, moves and releases the wire 15 in the wire processing system 1.

It is also possible for the gripping arm 55 to not be a part of a handling robot 30, but rather to be a technically simple gripping arm 55 which has a closed position for gripping the wires 15 and an open position for releasing the wires 15, and which is manually movable.

FIG. 4 shows a perspective view of the removal trough 22 from FIG. 1, with a batch of wires 15 in the removal trough 22, and with a gripping arm 55.

The gripping arm 55 is in the open position in FIG. 5a—that is, jaws 60, 61 of the gripping arm 55 are open or are arranged at a distance from each other. The gripping arm 55 and/or the jaws 60, 61 of the gripping arm 55 are positioned above the removal trough 22. A plurality of wires 15 processed by the wire processing machine 5 or a batch of wires 15 processed by the wire processing machine 5 is/are in the removal trough 22. They lie on a plurality of ribs 25, 26 and on the bottom surface 28 interrupted by recesses 90 or depressions or indentations.

Each jaw 60, 61 of the gripping arm 55 is divided into two parts—that is, each jaw 60, 61 comprises two gripping hooks 65-68. The distance between the gripping hooks 65-68 corresponds to the width of a rib 25, 26, such that each gripping hook 65-68 engages in a recess 90 or indentation between two ribs 25, 26 that are immediately adjacent to each other. It is also possible for the gripping hooks 65-68 to have a spacing which corresponds to a multiple of the width of a rib 25, 26.

FIG. 5a shows a perspective view of the removal trough 22 of FIG. 4, wherein the jaws 60, 61 of the gripping arm 55 are in an open position. FIG. 5b shows a perspective view of the removal trough 22 of FIG. 4, wherein the jaws 60, 61 of the gripping arm 55 are in a closed position and are gripping the batch of wires 15.

The gripping arm 55 is then lowered, such that parts of the gripping arm 55 and/or the jaws 60, 61 and/or the gripping hooks 65-68 move into the recesses 90 of the side walls 34, 35. Each of the four gripping hooks 65-68 moves into a recess 90 or depression in the side wall 34, 35.

The width of the recess 90 or indentation essentially corresponds to the width of the gripping hook 65-68 or is minimally larger than the width of the gripping hook 65-68.

The side wall 34, 35 is open to the side in the region of the recesses 90 or depressions. This means that part of the gripping arm 55 and/or the jaws 60, 61 can be located outside the removal trough 22, and at the same time part of the gripping arm 55 protrudes through the side wall 34, 35 or the recesses 90 or depressions of the side wall 34, 35.

However, it is also possible that the side walls 34, 35 are not open to the side in the region of the recesses 90 or depressions, such that the gripping arm 55 or parts thereof can only move into the removal trough 22 from above.

The lowermost part of the gripping hooks 65-68 and/or the jaws 60, 61 of the gripping arm 55 can be at the height of the base surface 29, or almost at the height of the base surface 29. In FIG. 5a, the underside of the gripping hooks 65-68 and/or the jaws 60, 61 of the gripping arm 55 can rest on the base surface 29 and/or contact it.

The jaws 60, 61 of the gripping arm 55 are then closed and/or the gripping arm 55 is transitioned from the open position shown in FIG. 5a into the closed position shown in FIG. 5b. The position of the gripping arm 55 overall is not changed in this case. The jaws 60, 61 and thus the gripping hooks 65-68 move towards each other.

The lower part of the gripping hook 65-68 slides and/or moves during the closing process from the open position into the closed position along the base surface 29 and/or moves parallel thereto. As a result, a part of the jaws 60, 61 or the gripping hooks 65-68 moves under the wires 15 or the batch of wires 15.

After closing, and/or in the closed position, the wires 15 or the batch of wires 15 is/are now held laterally and downwards by the jaws 60, 61 or gripping hooks 65-68 of the gripping arm 55 (i.e., in the direction of the gripping arm 55 towards the base surface 29), as shown in FIG. 5b.

The gripping arm 55 or the jaws 60, 61 of the gripping arm 55 can now be moved upwards—i.e., away from the bottom surface 28 or base surface 29, and in this way the wires 15 or the batch of wires 15 is/are moved out of the removal trough 22. The wires 15 can be transported and/or dropped into a box by the gripping arm 55. It is also possible for the wires 15 to be transferred from the gripping arm 55 to a further gripping arm.

It is also possible for a plurality of batches of wires 15 to be present in the removal trough 22, arranged at different positions along the longitudinal direction of the wires 15.

The gripper can also have only one jaw 60, 61.

It is also possible for each jaw 60, 61 to have only one gripping hook 65-68.

It is also conceivable that, particularly in the case of longer processed wires 15 in the removal trough 22, the wires 15 or the batch of wires 15 is/are gripped by several grippers at different positions. As a result, the wires 15 can be held even more securely and/or transported out of the removal trough 22.

The wires 15 of a batch typically have the same length and are located in the removal trough 22 substantially at the same position in the direction of the wire axis, as is shown by way of example in FIG. 5b.

The removal trough 22 can be composed of several removal trough parts. The removal trough parts can be structurally identical to each other and mirror-symmetric, such that the alignment of the removal trough parts (for example front/rear or right/left) is insignificant. The removal trough parts can be screwed together, connected with bolts, and/or glued together.

A repair is particularly simple and inexpensive in the case of a removal trough 22 made up of several removal trough parts, since only the damaged removal trough part has to be replaced.

The removal trough 22 is arranged on a rail 24 as shown in FIG. 2 and is designed to be displaceable, in the direction of displacement 80 of the removal trough 22, relative to the wire tray 20 in the direction of the longitudinal axis of the wires 15 (the longitudinal axis runs in the direction of its greatest extent) when they are in the removal trough 22. The displacement movement can be carried out pneumatically. By moving the removal trough 22 relative to the wire tray 20 and/or the wire processing machine 5, the removal trough 22 can be brought into a position in which the gripping arm 55 can remove the wires 15 from the removal trough 22 in a particularly technically simple and fast manner, since no parts of the wire tray 20 and/or the wire processing machine 5 are in the travel path or in the vicinity of the travel path of the gripping arm 55. As such, movements of the gripping arm 55 do not have to be carried out so precisely, and/or the movements can be carried out at high speed, since there is enough space, even in the positions at which the movement of the gripping arm 55 is stopped, for the gripping arm 55 and/or parts of it to continue to move a little further for a short time, or for the gripping arm 55 and/or parts thereof to vibrate.

The removal trough 22 can be a pressed sheet metal part, for example. A deep-drawn plastic is also possible, by way of example. The recesses 90 or depressions are preferably already formed during the production or shaping of the removal trough 22, such that no material has to be removed again afterwards.

It is also conceivable that each of the two side walls 34, 35 only has a single indentation or depression or recess 90 into which a part of the gripping arm 55 can be inserted.

The distance between the gripping hooks 65-68 corresponds to a distance between the recesses 90 and/or the indentations in the side walls 34, 35 and/or the distance between the recesses 90 and/or indentations in the bottom surface 28.

Finally, it should be noted that terms such as "having," "comprising," etc. do not preclude other elements or steps, and terms such as "a" or "an" do not exclude a plurality of elements or steps. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS 1 wire processing system
5 wire processing machine
8 crimping press
15 wire
20 wire tray
22 removal trough
24 rail
25, 26 rib
28 bottom surface
29 base surface
30 handling robot
31 sloping surface of the bottom surface
34, 35 side wall
40 sloping surface of the side wall
42 edge surface of the side wall
45 side wall surface of the side wall
55 gripping arm
60, 61 jaws
65, 66, 67, 68 gripping hooks
70 direction of dumping
80 direction of displacement of the removal trough/ longitudinal axis of the wires
90 recess

The invention claimed is:

1. A removal trough for a wire processing system, the removal trough comprising:
   a trough adapted to receive wires processed by a wire processing machine of the wire processing system;
   wherein the trough includes a pair of opposed side walls between which the wires are received;
   wherein each of the side walls has at least one recess formed therein for receiving a gripping arm to mechanically grip the wires received in the trough for removal of the wires from the trough; and
   wherein the trough is configured as a ribbed structure.

2. The removal trough according to claim 1 wherein the trough has a plurality of the recesses formed in each of the side walls and adjacent ones of the recesses in each of the side walls are arranged at equal distances from each other.

3. The removal trough according to claim 1 wherein the trough includes a bottom surface upon which the wires received in the trough partially rest, the bottom surface having recesses formed therein arranged at equidistant intervals for receiving the gripping arm to mechanically grip a side of the wires facing a bottom of the trough.

4. The removal trough according to claim 1 wherein the trough is formed by a deep drawing manufacturing process.

5. The removal trough according to claim 1 wherein the trough is symmetrical in a longitudinal plane thereof and wherein the longitudinal plane runs along a longitudinal axis of the wires when the wires are situated in the trough.

6. The removal trough according to claim 1 wherein the trough is formed from a plurality of removal trough parts, the removal trough parts being identical to each other.

7. The removal trough according to claim 1 wherein the recesses in the side walls open to an outside of the trough.

8. The removal trough according to claim 1 wherein each of the recesses in each of the side walls has a lesser width along a longitudinal direction of the wires received in the trough than a width of ribs between the recesses in the respective side wall.

9. A removal trough for a wire processing system, the removal trough comprising:
   a trough adapted to receive wires processed by a wire processing machine of the wire processing system;
   wherein the trough includes a pair of opposed side walls between which the wires are received;
   wherein each of the side walls has at least one recess formed therein for receiving a gripping arm to mechanically grip the wires received in the trough for removal of the wires from the trough; and
   wherein the trough is formed from a plurality of removal trough parts, the removal trough parts being identical to each other.

10. A removal trough for a wire processing system, the removal trough comprising:
    a trough adapted to receive wires processed by a wire processing machine of the wire processing system;
    wherein the trough includes a pair of opposed side walls between which the wires are received;
    wherein each of the side walls has at least one indentation formed therein for receiving a gripping arm to mechanically grip the wires received in the trough for removal of the wires from the trough; and
    wherein the side walls are open at the indentations.

* * * * *